March 3, 1970    D. W. DUFFEY    3,498,317
PLUG VALVES HAVING RELIEVED HIGH PRESSURE SEAL AREAS
Filed March 22, 1968    2 Sheets-Sheet 1
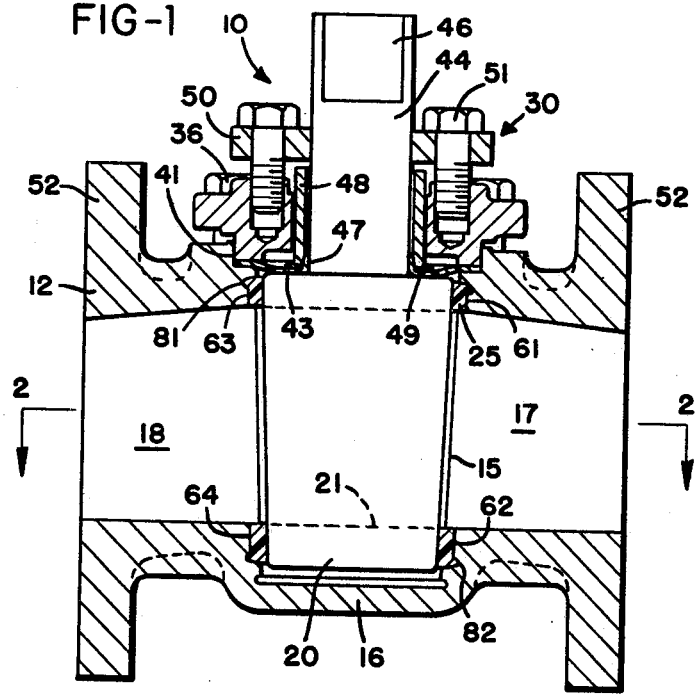
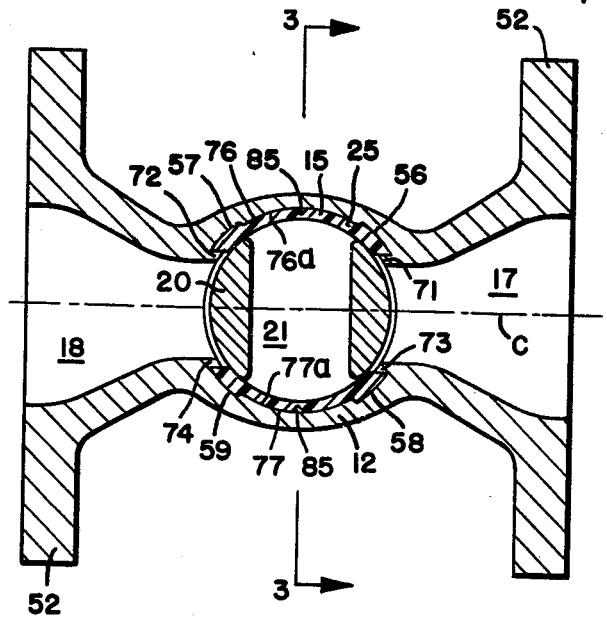
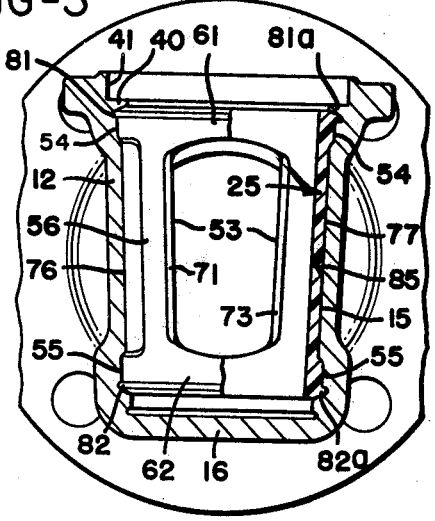
INVENTOR
DONN W. DUFFEY
BY
Marechal, Biebel, French & Bugg
ATTORNEYS March 3, 1970         D. W. DUFFEY         3,498,317
PLUG VALVES HAVING RELIEVED HIGH PRESSURE SEAL AREAS
Filed March 22, 1968         2 Sheets-Sheet 2
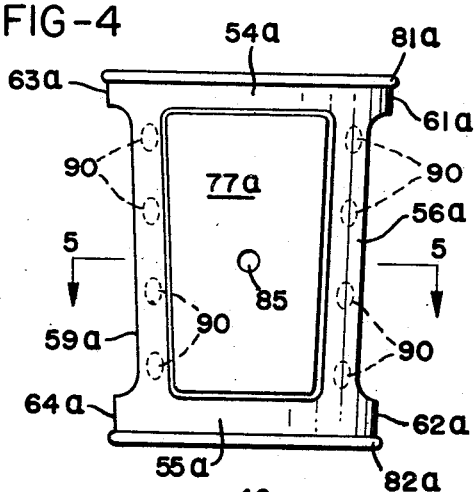
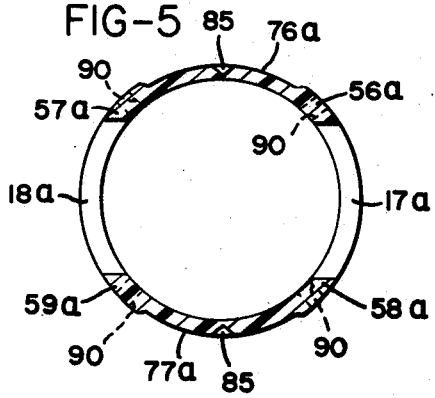
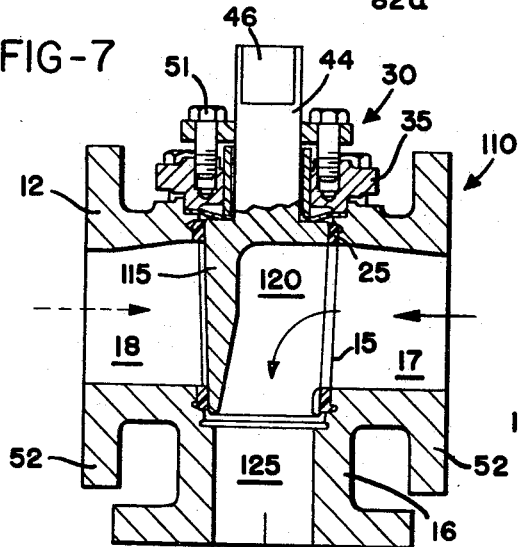
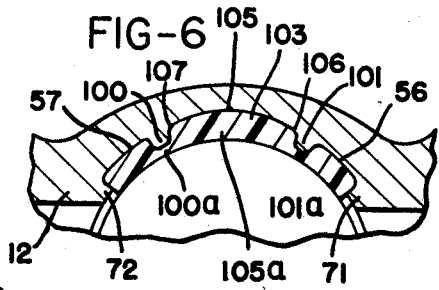
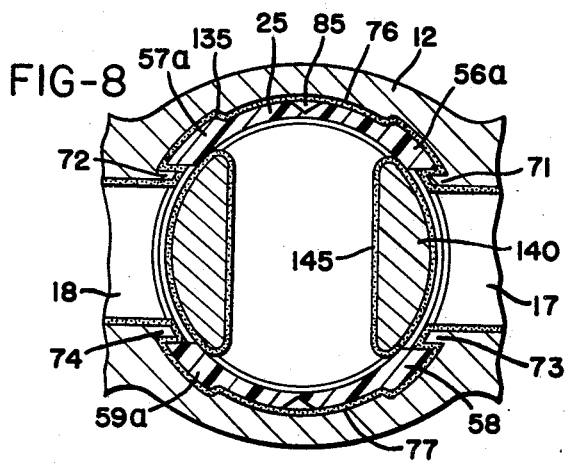

3,498,317
PLUG VALVES HAVING RELIEVED HIGH PRESSURE SEAL AREAS
Donn W. Duffey, Dayton, Ohio, assignor to The Duriron Company, Inc., Dayton, Ohio, a corporation of New York
Filed Mar. 22, 1968, Ser. No. 715,433
Int. Cl. F16k 5/02, 5/16, 25/00
U.S. Cl. 137—375   10 Claims

ABSTRACT OF THE DISCLOSURE

Corrosion resistant plug valves including a polytetrafluoroethylene (PTFE) sleeve seal element wherein the sleeve is secured against axial, radial and deflecting movements are described. The valve body has a pattern of relief areas in the bore such that the portions of the sleeve in the relief areas are under relatively high sealing pressure. The relief areas include top and bottom axially spaced circumferentially extending relief bands joined together by axially extending relieved sections arcuately spaced from angularly disposed body ports to provide a flange on each side of the body ports. The bore above and below the body ports is also relieved so that the flanges form axially extending bore flanges at the junction of the ports and the bore to prevent rotation of the sleeve. Spaced arcuately from the flanges and between the ports are portions which are relieved to a lesser amount and which also act to prevent rotation of the sleeve. The surface of the sleeve includes relieved areas opposite the portion of the bore between the ports. Two-way and multiple port valves as well as fully lined sleeve valves are also described.

BACKGROUND OF THE INVENTION

The present invention relates to corrosion resistant plug valves and more particularly to improved dual and multiple port plug valves in which the sleeve is secured against movement and displacement by an improved body construction.

Sleeve lined plug valves are known in which the seal element is a tubular member of PTFE secured against the body to prevent rotational movement thereof, see U.S. Patents 2,961,214 and 3,206,163. U.S. Patent 2,728,550 describes a non-circular sleeve received within a non-circular bore to prevent rotation of the sleeve. U.S. Patent 2,987,295 describes a valve structure in which "blow-out" of the sleeve is prevented when turning the valve from the open to the closed position, and U.S. Patent 3,199,835 describes a structure in which a harness type seal element is used in a body which includes annular shoulders at the inner ends of the port to prevent movement of the sleeve with respect to the body. This latter patent also describes annular shoulders projecting into the bore to prevent movement of a tubular sleeve element. All of the above patents are assigned to the present assignee.

Also of interest in sleeve lined plug valves is U.S. Patent 3,061,269 in which high pressure seal areas are obtained by compressing portions of the sleeve beyond the elastic limits of PTFE, and U.S. Patent 3,066,909 in which holes are provided in the sleeve to prevent rupture or turning thereof in turning the plug from the open to the closed position.

U.S. Patent No. 3,263,697 describes a valve structure utilizing a shiftable plug for use as a so-called "fire safe" valve. This latter valve also includes continuous shoulders projecting into the bore of the body and shows relief areas in the body spaced between the ports. The thicker portions of the sleeve received in the relief areas are under low sealing pressure as compared to the thinner portions of the sleeve.

Reference is also made to application Ser. No. 715,434, filed of even date herewith, and assigned to the same assignee as this application.

SUMMARY OF THE INVENTION

The present invention differs from the above noted patents by the provision of a plug valve in which the body includes a frustoconical bore which receives a full frustoconical sleeve. The bore includes a pattern of differentially recessed relief areas thereon which receive the sleeve, the portions of the sleeve received in the relief areas being under high sealing pressure as compared to the portions of the sleeve which are not received in the reliefs in the body. The pattern of relief areas includes axially spaced reliefs above and below the angularly spaced ports in the body and relieved sections communicating with the top and bottom of each port. Also provided are arcuately spaced axially extending reliefs spaced on each side of the body ports to form flanges between the body ports and the axially extending reliefs, the flanges defining the radial dimension of the bore. The sleeve is sufficiently thick in cross-sectional dimension to maintain the plug spaced from the flanges which extend axially along the port and which form the junction of the port and the bore. The bore also includes relieved portions between the angularly spaced ports which separate the axially extending relief sections, the radial dimensions of the relieved portions being greater than the normal bore diameter and less than the axially spaced and axially extending relief areas. The bore of the body includes a base, which in the case of a multiple port valve includes a port, the plug being registrable with one or the other of the angularly disposed ports and the port in the base.

The body further includes grooves above and below the angularly spaced ports to prevent axial movement of the sleeve. In the case of larger valves, that is, three inches and up, it is desirable to use pressure relief means in the sleeve to vent the back side of the sleeve when the plug is being rotated from the open to the closed position, especially where the valve is operating under conditions of relatively high temperature and/or pressure. It is also desirable to utilize pressure communication diaphragms in the sleeve which rupture at a predetermined pressure to prevent rotation or damage to the sleeve when rotating the plug from the open to the closed position. If desired, all interior surfaces of the body may be coated with a corrosion resistant coating, and the plug may also have all surfaces thereof coated with a corrosion resistant coating.

Accordingly, a primary object of the present invention is the provision of an improved corrosion resistant plug valve in which a frustoconical body bore is constructed to provide high pressure seal areas in the thicker portion of a frustoconical polytetrafluoroethylene sleeve which is received between the closure member and the bore, while the thinner portions of the sleeve are at a lower sealing pressure.

Another object of the present invention is the provision of an improved plug valve of the type described in which the frustoconical body bore is differentially recessed and receives a sleeve which is preformed and pre-ported and having a configuration which essentially matches that of the body bore thereby substantially reducing the amount of polytetrafluoroethylene used in the sleeve while providing a valve which seals efficiently over a wide range of temperatures and pressure.

Still another object of the present invention is the provision of an improved plug valve having a differentially recessed bore in which the sleeve is securely anchored to prevent axial and rotational movement thereof, the thicker portions of the sleeve being under relatively high sealing pressure, and in the case of larger valves exposed to relatively high temperatures and pressures, the sleeve is provided with pressure passages which prevent deflection of the sleeve into the plug port as the plug is rotated from the open to the closed position.

BRIEF DESCRIPTION OF THE DRAWINGS

FIG. 1 is a view in axial section and partly in elevation of a plug valve in accordance with the present invention;

FIG. 2 is a sectional view taken along the lines 2—2 of FIG. 1;

FIG. 3 is a sectional view taken along the lines 2—2 of FIG. 2 with a portion of the sleeve broken away to show the interior of the valve body;

FIG. 4 is a view in perspective of a sleeve used in the valve of the present invention;

FIG. 5 is a sectional view taken along the lines 5—5 of FIG. 4;

FIG. 6 is an enlarged fragmentary section showing a modified form of valve in accordance with the present invention;

FIG. 7 is a view similar to FIG. 1 showing a multiple port valve in accordance with the present invention; and FIG. 8 is a fragmentary sectional view showing a fully lined sleeve valve in accordance with the present invention.

Referring to the drawings, which illustrate a preferred embodiment of the present invention, FIGS. 1–3 show a corrosion resistant valve 10 which includes a body 12, preferably of a corrosion resistant material such as a metal or metal alloy. The body 12 includes a frustoconical tapered bore 15 extending transversely thereof, the smaller end of the bore being closed by an integrally formed base 16, although this may be a separate member if desired.

Communicating with the bore 15 are angularly spaced ports 17 and 18 which, in the case of a two-way valve are inlet and outlet ports. Received within the bore 15 is a rotatable closure member 20 in the form of a tapered plug and which includes a port 21 communicating with the angularly spaced body ports 17 and 18. The plug 20 is of a smaller radial dimension than the radial dimensions of the bore to form an annular clearance between the outer surface of the plug and the bore.

Received within the annular clearance is a tubular sleeve 25, the sleeve being frustoconical in shape and being of polytetrafluoroethylene, a fluorocarbon resin which is relatively chemically inert. The sleeve, which is of a cross-sectional dimension sufficient to maintain the plug spaced from the bore, includes ports therein, as shown, which communicate with the angularly spaced body ports. Positioned over the open end of the bore is a top cap assembly generally designated 30 and including a cap member 35 secured to the valve body by bolts 36, the inner portion of the cap being sealed on a shoulder 40 which is formed in a counterbore 41 at the open end of the bore. Positioned between the shoulder 40 and the cap 35 is an annular thrust-diaphragm 43 of PTFE.

The plug 20 includes a stem 44 which projects through the cap 35, the stem being provided with flats 46 on each side thereof for locking engagement with an operating member in the usual way. The diaphragm 43 is provided with an opening through which the stem 44 extends, with the inner peripheral portion 47 of the diaphragm being in engagement with the stem. Sealing pressure of the plug with the sleeve 25 is maintained by means of a gland 48 which surrounds the stem 44 and which engages the upper surface of the plug through an annular disk 49 positioned between the bottom of the gland 48 and the upper surface of the diaphragm 43, the gland 48 being forced against the plug by a gland follower 50 adjustably secured to the cap 35 by bolts 51.

The body 12 includes flanges 52 provided with bolt holes (FIG. 3) for attachment of the valve to a conduit in the usual manner. It is understood, however, that the valve may be of the screwed end type, if desired.

Each of the body ports 17 and 18 which open into the bore in angularly spaced relation includes essentially straight side walls 53 as shown in FIG. 3, and for purposes of this invention, "essentially straight side walls" is intended to include slightly curved side walls. The bore of the body includes a pattern of indentations of different radial dimensions thereon which form relief means in the bore which have a radial dimension greater than the corresponding radial dimension of the bore.

The relief means includes axially spaced top and bottom relief bands 54 and 55, respectively, which extend circumferentially on each side of the bore from port to port. Joining the relief bands 54 and 55 together are arcuately spaced relief sections 56, 57 on one half of the bore and relief sections 58 and 59 on the other half of the bore, the halves of the bore being identified with reference to the center line $c$ in FIG. 2. Immediately above and below each port 17 and 18 are relief areas 61, 62, 63 and 64, respectively, which with relief bands 54 and 55 form continuous annular reliefs, although interrupted relief areas may be used, if desired.

The relief sections 56, 57, 58 and 59 are arcuately spaced on each side of the associated body port to form four flanges 71, 72, 73 and 74, respectively, which extend axially approximately the same distance as the associated port opening. These flanges form the junction between the port and the bore and define the radial dimension of the bore. The relief sections 56, 57, 58 and 59 on the same side of the body are separated from each other by relief portions of the bore 76 and 77, respectively, located between the body ports and bounded top and bottom by relief bands 54 and 55. The radial dimensions of the relief portions 76 and 77 are greater than the corresponding radial dimensions of the bore flanges 71–74, inclusive and less than the radial dimensions of relief bands 54 and 55 and relief sections 56, 57, 58 and 59. Located axially above and below the relief bands 54 and 55 are grooves 81 and 82, respectively, which have radial dimensions greater than the radial dimensions of the relief sections and relief bands and which operate to prevent axial movement of the sleeve in response to changes in temperature, and in case of groove 82, prevents displacement of the portion of the sleeve immediately below the port into the port in the event of accumulation of pressure between the bottom of the plug and the base of the bore. While shown as continuous, it is understood that these grooves may be interrupted.

The sleeve, in accordance with the present invention, is preformed and pre-ported for reception into the bore 15, and the various portions are numbered with the suffix $a$ being used to identify the portions of the sleeve received in the opposing portion of the bore. As shown in FIGS. 4 and 5, the sleeve is of reduced cross-section in areas 76a and 77a which are received opposite the relieved portions of the bore 76 and 77, these areas forming relief areas of low sealing pressure and cooperating with the bore and with flanges 71–74 to prevent rotation of the sleeve relative to the bore and to reduce the turning torque. While the areas 76a and 77a are shown in contact with the opposed portions of the bore, it is understood that there may be a small space therebetween, or an interference fit with some slight sealing pressure, depending upon the extent to which the plug is urged axially into the bore. While the term "relief areas" is used to describe portions 76a and 77a of the sleeve, these areas in fact are the normal cross-sectional dimension of the sleeve, and the term is used because it describes the function performed by these portions of the sleeve. Thus, the cross-sectional dimension of the sleeve in areas 76a and 77a is sufficient to maintain the plug spaced from the portions of the body forming the bore, i.e., 71–74 and 76 and 77.

The sleeve includes port openings 17a and 18a which have a greater arcuate dimension than the openings of the corresponding body ports. Portions 56a, 57a, 58a and 59a of the sleeve are of greater cross-sectional dimension than portions 76a and 77a for reception into the corresponding relief sections 56–59 of the body. The portions 61a, 62a, 63a and 64a of the sleeve immediately above and below the sleeve ports are of the same cross-sectional dimensions as the portions 56a–59a for reception into relieved portions 61–64 of the bore. Immediately above and below each area 76a and 77a of the sleeve are portions 54a and 55a which are received in the relief bands 54 and 55 of the bore, while portions 81a and 82a are received in the grooves 81 and 82. As shown, the cross-sectional dimensions of portions 81a and 82a are greater than the cross-sectional dimensions of the portion of the sleeve received in the relief areas in the body.

The sleeve is easily fabricated by forming a frusto-conical blank and machining the ports and the areas 76a and 77a, or the sleeve may be formed isostatically in which case the ports are cut after processing. The latter procedure offers the advantages of being able to form at least a major portion of the areas 76a and 77a in the molding operation. For details of isostatically molding, reference is made to Ser. No. 497,869, filed Oct. 19, 1965, and assigned to the same assignee.

In assembling the sleeve in the body, one of several methods may be used. For example, the sleeve may be chilled to a low temperature and because of the high coefficient of thermal expansion, it contracts sufficiently to fit into the bore. As the sleeve warms up it "snaps" into place, and a sizing operation may be used with a dummy plug to insure reception of the sleeve into the appropriate reliefs. There is not, however, the substantial movement of PTFE which occurs in the hot or cold forming procedures described in the previously identified patents. Thereafter, a working plug is inserted into the sleeve and top cap assembly is assembled to the body. Alternately, the sleeve may be coined to reduce its diameter and assembled into the body, and as the PTFE recovers, the sleeve "snaps" into place. Again, a sizing plug may be used if desired. One of the advantages in the valve in accordance with the present invention is the ease of assembling the component parts thereof, particularly the sleeve which is preformed to fit the body, and which may be assembled thereto without the use of heat or the application of pressures necessary to deform the sleeve substantially as is described in some of the preceding patents.

Once assembled, the sleeve is compressed between the plug and the body to provide a seal element and bearing surface in which a pattern of high pressure sealing areas is formed for efficient sealing. The initial dimensions of the sleeve are so coordinated and correlated with the bore dimensions and the dimensions of the relief means that the sleeve fits and seals particularly in the relieved portions of the bore. The pattern of high pressure seal areas is defined by portions 54a and 55a at the top and bottom of the sleeve, 56a, 61a, 62a and 58a around one port, and 63a, 59a, 64a and 57a around the other port. Each of the relief areas 76a and 77a of the sleeve is in turn surrounded by high pressure seal areas as shown in FIGS. 4 and 5. Thus, the thicker portions of the sleeve are at a higher sealing pressure than the thinner portions, the sleeve being secured by being received within the relief means in the bore and the relieved portions of the bore which are received by the reliefs in the sleeve as well as the portions of the bore which form the flanges 71–74.

The sleeve also includes a pressure burst diaphragm 85 positioned on each side of the bore and between the ports (FIGS. 4 and 5), and operative to burst if the pressure between the bore increases above a predetermined minimum as described in application Ser. No. 524,697, filed Feb. 3, 1966, now U.S. Patent No. 3,383,088, issued May 14, 1968, and assigned to the same assignee. In this way, pressure above a predetermined minimum is vented into the plug port to prevent tearing or turning of the sleeve when the plug is rotated from the closed to the open position.

It has also been observed, particularly in the case of larger size valves, for example, three inches and up used in services at relatively high temperatures and pressures that there is a tendency of the portion 59a of the sleeve adjacent the inlet port 17a to deflect inwardly toward the plug port as the plug is rotated from the open to the closed position. Essentially the same thing may occur with portions 56a, 57a and 59a of the sleeve depending upon which port is the inlet port and the direction in which the plug is rotated in order to move from the open to the closed position. This condition exists, notwithstanding the presence of the flanges 71–74, because at relatively high temperatures and pressures in the larger size valves, the PTFE material is sufficiently softened to be deflectable into the plug port. Accordingly, in the case of larger valves embodying the principles of the present invention, the sleeve includes pressure relief means 90 as shown, in dotted lines, which prevent build-up of pressure between the reliefs in the bore and the back side of the sleeve tending to force the sleeve into the plug port on the upstream side as the plug is rotated from the open to the closed position. By using pressure relief means adjacent each side of the body ports, the valve is omnidirectional in the direction of rotation of the plug and in the direction of fluid flow. It is understood, however, that in the case of a valve in which the inlet side is port 17a and the outlet 18a, that is, a unidirectional valve, with rotation of the plug in a clockwise direction, as indicated, in going from the open to the closed position, the pressure relief holes need be used only in portion 58a of the sleeve. In a bi-directional valve in which the inlet may be 17a or 18a with the plug being rotated in the same direction above, in addition to using pressure relief holes in portions 58a of the sleeve, pressure relief holes are also used in portion 57a of the sleeve. Alternatively, a unidirectional valve may incorporate a downstream closing principle, that is the downstream side of the valve closes before the upstream side. This may be accomplished several ways, as shown in the patents previously identified.

FIG. 6, a fragmentary sectional view of a valve, in which the same reference numerals have been used where applicable, shows a modification in which the valve body 12 includes a second set of axially extending flanges 100 and 101 arcuately spaced from flanges 72 and 71, respectively. Although not shown, another set of flanges is associated with flanges 73 and 74. The axially extending flanges are bounded top and bottom by the relief bands 54 and 55, and on one side by the corresponding axially extending relief sections 56–59. The portion 103 of the bore between the adjacent flanges 100 and 101 is relieved to a lesser extent than relief sections 56–59, and may be non-uniformly relieved so that the center 105 has a greater radial dimension than the edges 106–107.

The sleeve 15 includes areas of reduced section 100a and 101a overlying the flanges 100 and 101 and a portion 105a of somewhat greater cross-section therebetween, the portion 105a of the sleeve forming a low pressure seal. The remaining portion of the sleeve is as previously described. This sleeve is also fabricated and assembled as previously described.

The advantage of the sleeve valve shown in FIG. 6 is the thicker portion of the sleeve between the ports and the additional locking action obtained by the flanges 100 and 101 on each side of the ports.

Referring to FIG. 7 in which like reference numerals have been used, a "three-way" valve 110 is shown in which the interior portions of the body and the sleeve are essentially the configuration of the bore and sleeve previously described in FIGS. 1–3. In the three-way valve shown in FIG. 7, the plug 115 includes a port 120 which is registrable with one or the other of the angularly disposed ports 17 or 18 and with the third port 125 opening into the bore and formed through the base 16 of the valve body. It is also understood, that other porting arrangements may be employed in multiple port valves as is well known to those skilled in the art.

Satisfactory results have been obtained in a three inch valve exposed to temperatures of 350° F. using a sleeve of about 0.125 inch cross-section in portions 76a and 77a of the sleeve, although different cross-sectional dimensions may be used for larger and smaller valves, or valves exposed to lower temperatures, as will be apparent to those skilled in the art.

FIG. 8 illustrates a modified form of the present invention in which all portions of the interior of the bore and the ports are coated with a corrosion resistant plastic coating 135 shown as the stippled portions, the coating in the portion of the bore being interposed between the sleeve 15 and the body. The coating also extends through the ports and around the outer face of the flanges (not shown), and if desired, the outside surface of the body may likewise be coated with such a material. Typical materials which may be used for the corrosion resistant plastic are chlorinated polyethers of molecular weight between 250,000 and 350,000, and epoxy resins, i.e., condensation products of epichlorohydrin and Bisphenol A of molecular weight above 1400, as well as epoxidized novolak resins. The advantage of a structure of this type is the reduced cost of the body casting which may be a ductible iron rather than the somewhat more expensive corrosion resistant metal and metal alloys.

In the valve shown in FIG. 8, the interior configuration of the bore and the configuration of the sleeve are essentially that of the bore and sleeve previously described. As shown, the plug 140 may also have a corrosion resistant plastic coating 145 on all fluid contacting surfaces thereof, in which event a material such as ductile iron may be used for the plug.

It will be apparent to those skilled in the art that various modifications of the invention may be made. For example, instead of the top cap seal assembly shown, that described in application Ser. No. 607,703, filed Jan. 6, 1967, now U.S. Patent No. 3,306,707, issued October 22, 1968, and assigned to the same assignee, may be used.

I claim:

1. In a sleeve lined corrosion resistant plug valve adapted to control flow of fluids, said valve including a body having a bore including a base, said bore extending transversely thereof and ports therethrough at least two of which open into said bore in angularly spaced relation, a tapered valve plug received in said bore and including port means for alignment with said body ports, said plug being of sufficiently smaller radial dimensions than said bore to establish an annular clearance between the opposed surfaces thereof, sleeve means received in said clearance and having port means therein communicating with said body ports, means maintaining said plug in sealing engagement with said sleeve means during rotational movement from one position to another, said sleeve means being generally tubular and formed of fluorocarbon material, the improvement comprising relief means formed in said bore and having a radial dimension greater than the corresponding radial dimension of said bore, said relief means including circumferentially extending relief areas axially spaced above and below said angularly spaced ports and relieved portions extending towards and communicating with the top and bottom of each angularly spaced port, said relief means also including relieved sections between said angularly spaced ports, a pair of axially extending arcuately spaced flanges on each side of said angularly spaced ports and defining the radial dimension of said bore, each said flange being spaced from the plug and including a side edge engaging the side edge of the corresponding port of said sleeve to prevent rotation thereof, each said flange having an axial dimension essentially that of the corresponding angularly spaced port, means between said sleeve and said body located between said angularly spaced body ports defining areas of low sealing pressure in said sleeve, the portions of said sleeve received in said relief means being thicker than the remaining portions of said sleeve and being under greater sealing pressure than the remaining portions of said sleeve and said bore and sleeve and plug being essentially frustoconical in shape.

2. In a sleeve lined plug valve as set forth in claim 1 wherein said base includes a port therethrough opening into said bore, the port in said plug being registrable with one or the other of said angularly disposed body ports and the port in said base.

3. In a sleeve lined plug valve as set forth in claim 1 wherein said means defining areas of low sealing pressure are relief pockets on the outside surface of said sleeve means, said sleeve means including pressure relief means therein providing communication between the back side of said sleeve and said plug port during rotation of said plug from one position to another to prevent deflection of said sleeve into said plug port during rotation thereof.

4. In a sleeve lined plug valve as set forth in claim 1 wherein all interior portions of said body exposed to fluid are covered with a liquid impervious relatively thin coating of corrosion resistant material, said coating being interposed between said sleeve and said body.

5. In a sleeve lined plug valve as set forth in claim 1 wherein said sleeve is pure polytetrafluoroethylene and wherein said body includes means between the base and said angularly disposed ports having a radial dimension greater than the corresponding relief means and receiving said sleeve to prevent axial movement thereof.

6. In a sleeve lined plug valve as set forth in claim 1 wherein said body includes projections located between said body ports and between said axially spaced circumferentially extending relief areas, said projections including edge portions angularly spaced from each of said flanges to define an axially extending relief depression associated with each flange and connected to said axially spaced circumferential relief areas, and said projections having a radial dimension greater than the radial dimension of said flanges and less than the radial dimension of said relief means.

7. In a sleeve lined plug valve as set forth in claim 6 wherein said sleeve includes relief pocket means on the outside surface thereof facing said projections.

8. In a sleeve lined plug valve as set forth in claim 7 wherein said angularly disposed port are inlet and outlet ports and wherein said sleeve means includes pressure relief means therein providing communication between the back side of said sleeve and said plug port during rotation of said plug from the open to the closed position to prevent deflection of said sleeve into said plug port during rotation thereof, and said pressure relief means being out of communication with said plug in the closed position thereof.

9. In a sleeve lined plug valve as set forth in claim 7 wherein said sleeve includes spaced pressure relief means in said relief pocket means, said pressure relief means operative above a predetermined minimum pressure between said body and said sleeve to relieve pressure into said plug port to prevent tearing or turning of said sleeve as the plug is rotated from the closed to the open position.

10. In a sleeve lined plug valve as set forth in claim 1 including additional flange means arcuately spaced from said flanges and forming axially extending relief areas therebetween, and the portion of said sleeve received between adjacent flange means being under relatively low sealing pressure.

(References on following page)

References Cited

UNITED STATES PATENTS

| | | | |
|---|---|---|---|
| 1,915,161 | 6/1933 | Jordan | 137—625.47 XR |
| 2,728,550 | 12/1955 | Sinkler | 251—317 |
| 2,911,187 | 11/1959 | Owsley | 251—316 |
| 3,061,269 | 10/1962 | Sinkler | 251—317 |
| 3,066,909 | 12/1962 | Reed | 251—309 |
| 3,133,722 | 5/1964 | McGuire et al. | 251—309 |
| 3,199,835 | 8/1965 | Freed | 251—309 |
| 3,276,739 | 10/1966 | Freed | 137—375 XR |
| 3,310,278 | 3/1967 | Smith | 251—317 |
| 3,438,388 | 4/1969 | Schenck | 137—375 |

HENRY T. KLINKSIEK, Primary Examiner

U.S. Cl. X.R.

137—625.47; 251—317